(12) United States Patent
Fukagawa et al.

(10) Patent No.: US 8,746,880 B2
(45) Date of Patent: Jun. 10, 2014

(54) OPTICAL PRODUCT AND EYEGLASS PLASTIC LENS

(75) Inventors: Tsuyoshi Fukagawa, Okazaki (JP); Noboru Otani, Okazaki (JP); Hirotoshi Takahashi, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 197 days.

(21) Appl. No.: 13/306,273

(22) Filed: Nov. 29, 2011

(65) Prior Publication Data

US 2012/0069295 A1    Mar. 22, 2012

Related U.S. Application Data

(63) Continuation of application No. PCT/JP2010/059854, filed on Jun. 10, 2010.

(30) Foreign Application Priority Data

Jun. 16, 2009  (JP) ................. 2009-143635

(51) Int. Cl.
 *G02B 1/11*    (2006.01)
(52) U.S. Cl.
 USPC ..................... 351/159.57; 359/585
(58) Field of Classification Search
 USPC ..................... 351/159.57; 359/585
 See application file for complete search history.

(56) References Cited

U.S. PATENT DOCUMENTS

| 5,719,705 A * | 2/1998 | Machol ................ 359/581 |
| 6,399,228 B1 * | 6/2002 | Simpson ............... 428/699 |
| 2003/0173545 A1 * | 9/2003 | Hino et al. ............. 252/500 |
| 2004/0047047 A1 * | 3/2004 | Yamaguchi et al. ...... 359/666 |
| 2008/0050600 A1 | 2/2008 | Fan et al. |
| 2011/0151167 A1 * | 6/2011 | Okumura et al. ......... 428/40.6 |

FOREIGN PATENT DOCUMENTS

| EP | 1 300 433 A2 | 4/2003 |
| JP | 01-309003 A1 | 12/1989 |
| JP | 05-104673 A1 | 4/1993 |
| JP | 10-120444 A1 | 5/1998 |
| JP | 2004-061866 A1 | 2/2004 |
| JP | 2006-175438 A1 | 7/2006 |
| JP | 2007-127681 A1 | 5/2007 |

OTHER PUBLICATIONS

European Search Report, European Patent Application No. 10789423.0; dated Aug. 31, 2012 (9 pages).
Japanese Office Action dated May 14, 2013.

* cited by examiner

*Primary Examiner* — Evelyn A Lester
*Assistant Examiner* — William Alexander
(74) *Attorney, Agent, or Firm* — Burr & Brown, PLLC

(57) ABSTRACT

An antifouling film is introduced on a base of an optical product such that (1) an absolute value of a charged electrostatic potential is 2.00 kV or less, and (2) a surface peel strength is 0.10 N/19 mm or less. A hard coat film and an optical multilayer film are placed between the base of the optical product and the antifouling film. An antireflection film is provided as the optical multilayer film, and a base of a spectacle plastic lens is provided as the base of the optical product.

3 Claims, No Drawings

OPTICAL PRODUCT AND EYEGLASS PLASTIC LENS

BACKGROUND OF THE INVENTION

This application claims the entire benefit of Japanese Patent Application Number 2009-143635 filed on Jun. 16, 2009, and International Patent Application PCT/JP2010/059854 filed on Jun. 10, 2010, the entirety of which is incorporated by reference.

FIELD OF THE INVENTION

The present invention relates to an optical product such as a camera lens, and to a spectacle plastic lens.

DESCRIPTION OF RELATED ART

Optical products made of plastic are likely to adhere grime such as dirt or dust due to static electricity, and a spectacle lens in particular must be wiped frequently. If the lens is wiped or the like with dust thereon, the dust may scratch the lens surface. In other optical products as well, dust adhered thereto may affect output image and the like.

Attempts have been made in the past to suppress the adhesion of dust by preventing electrostatic charging of the optical product. A known method for obtaining an antistatic property is to provide a conductive coating layer as described in Japanese Patent Application Publication No. JP-A-H05-104673 and Japanese Patent Application Publication No. JP-A-H01-309003 below. In Japanese Patent Application Publication No. JP-A-H05-104673, a hard coat layer formed on a base contains conductive tin oxide. Japanese Patent Application Publication No. JP-A-H01-309003 mentions an antireflection film including a transparent conductive film (an indium tin oxide film or an ITO film) formed by adding 5 to 10 weight percent (wt %) of tin oxide to indium oxide.

SUMMARY OF INVENTION

In such an optical product having a conductive coating layer, the surface potential remains at zero even when the optical product is wiped or the like. The optical product is less likely to attract dust compared to an optical product that does not have such a coating layer and is thus electrostatically charged. However, even if the surface potential is zero, electrostatically charged dust may be adhered to the optical product due to the potential difference between the surface potential and the electrostatically charged dust.

Moreover, although providing the conductive coating layer can make the optical product less likely to adhere dust, the coating layer does not work for dust that has already been adhered to the optical product, and the coating layer does not facilitate the removal of such adhered dust.

It is an object of the invention according to a first aspect of the present invention to provide an optical product and a spectacle plastic lens, which are less likely to adhere dust having static electricity, and from which adhered dust can be easily removed.

In order to achieve the above object, the invention according to the first aspect is related to an optical product characterized in that an antifouling film is formed on a base of the optical product to satisfy the following conditions: (1) an absolute value of a charged electrostatic potential is 2.00 kV or less, and (2) a surface peel strength is 0.10 N/19 mm or less.

In order to achieve an object to provide an optical product having strength, optical characteristics such as antireflection, and a high-level antifouling property in addition to the above object, the invention according to a second aspect of the present invention is provided in that, in the above invention, a hard coat film and an optical multilayer film are sequentially formed on the base of the optical product, and the antifouling film is formed on the optical multilayer film.

In order to achieve an object to provide a higher-level antifouling performance in addition to the above object, the invention according to a third aspect of the present invention is provided in that, in the above, invention, a conductive film is placed between the base of the optical product and the antifouling film.

In order to achieve an object to provide an optical product capable of facilitating formation of the antifouling film and capable of easily adjusting the peel strength in addition to the above object, the invention according to a fourth aspect of the present invention is provided in that, in the above invention, the antifouling film is formed by performing coating with a silane compound having a perfluoropolyether group, wherein a coating film when made only of the silane compound has a peel strength of 0.10 N/19 mm or less.

In order to achieve an object to facilitate formation of the optical multilayer film while considering formation of the antifouling film in addition to the above object, the invention according to a fifth aspect of the present invention is provided in that, in the above invention, the optical multilayer film is a multilayer film of an inorganic oxide.

In order to achieve an object to provide an optical product having high strength by achieving satisfactory matching with the optical multilayer film in addition to the above object, the invention according to a sixth aspect of the present invention is provided in that, in the above invention, the hard coat film contains an organosiloxane resin and inorganic oxide fine particles.

In order to achieve an object to provide a spectacle plastic lens that belongs to such an optical product having a high optical performance and a high antifouling performance as described above, the invention according to a seventh aspect of the present invention is related to a spectacle plastic lens characterized in that, in the above invention, the base of the optical product is a base of the spectacle plastic lens, and the optical multilayer film is an antireflection film.

According to the present invention, an optical product having a high antifouling performance can be provided by introducing an antifouling film that satisfies the following conditions: (1) an absolute value of a charged electrostatic potential is 2.00 kV or less, and (2) a surface peel strength is 0.10 N/19 mm or less.

DETAILED DESCRIPTION OF THE INVENTION

An embodiment of the present invention will be described below. Note that the present invention is not limited to the following embodiment.

An optical lens as an example of an optical product of the present invention has a hard coat film, an optical multilayer film, and an antifouling film on a front surface of a lens base, in that order from the lens base. Note that the film configuration may be modified. For example, a primer layer may be formed between the front surface of the lens base and the hard coat film, or an intermediate layer may be provided between the front surface of the lens base and the hard coat film, between the hard coat film and the optical multilayer film, between the optical multilayer film and the antifouling film. Alternatively, the hard coat film, the optical multilayer film, and the like may be formed on a back surface of the lens base or on both the front and back surfaces of the lens base.

Examples of a material (a base material) of the lens base include a polyurethane resin, an episulfide resin, a polycarbonate resin, a polyester resin, an acrylic resin, a polyethersulfone resin, a poly-4-methylpentene-1 resin, and a diethylene glycol bisallyl carbonate resin. A preferred example of the material of the lens base having a high refractive index is a polyurethane resin that is obtained by addition-polymerizing a polyisocyanate compound and a polythiol and/or a sulfur-containing polyol. Another preferred example of the material of the lens base having a higher refractive index is an episulfide resin that is obtained by addition-polymerizing an episulfide group and a polythiol and/or a sulfur-containing polyol.

The hard coat film is formed by uniformly coating the lens base with a hard coat solution. For example, an organosiloxane resin containing inorganic oxide fine particles is used as a material of the hard coat film, and in this case, the hard coat solution is prepared by dispersing (mixing) mainly an organosiloxane resin and an inorganic oxide fine particle sol in water or an alcohol solvent.

A preferred example of the organosiloxane resin is one obtained by hydrolyzing and condensing an alkoxysilane. Specific examples of the alkoxysilane include γ-glycidoxypropyltrimethoxysilane, γ-glycidoxypropyltriethoxysilane, methyltrimethoxysilane, and ethyl silicate. Hydrolyzed condensations of these alkoxysilanes are produced by hydrolyzing the alkoxysilane compounds or combinations thereof using an acidic aqueous solution such as hydrochloric acid.

Specific examples of the inorganic oxide fine particles include one of sols of zinc oxide, silicon dioxide, aluminum oxide, titanium oxide, zirconium oxide, tin oxide, beryllium oxide, antimony oxide, tungsten oxide, and cerium oxide, or alloys of two or more of the sols. In order to ensure transparency of the hard coat film, the particle size of the inorganic oxide fine particles is preferably 1 to 100 nanometers (nm), and more preferably 1 to 50 nm. Moreover, the amount of inorganic oxide fine particles is preferably 40 to 60 wt % based on the hard coat components in order to ensure appropriate levels of hardness and toughness of the hard coat film.

In addition, an acetylacetone metal salt, an ethylenediaminetetraacetic acid metal salt, or the like may be added as a curing catalyst to the hard coat solution, and a surfactant, a colorant, a solvent, or the like may be further added as necessary for adjustment.

The thickness of the hard coat film is preferably 0.5 to 4.0 micrometers (μm), and more preferably 1.0 to 3.0 μm. The lower limit of this thickness is determined as described above because sufficient hardness cannot be obtained if the hard coat film is thinner than this lower limit. On the other hand, the upper limit of this thickness is determined as described above because there is a significantly increased possibility of problems related to physical properties, such as the occurrence of cracks and embrittlement, if the hard coat film is thicker than this upper limit.

The optical multilayer film is formed by alternately laminating a low refractive index layer and a high refractive index layer using a vacuum deposition method, a sputtering method, or the like. Examples of the multilayer film include an antireflection film, a mirror, a half mirror, a neutral density (ND) filter, a bandpass filter, and the like. Each layer is made of an inorganic oxide, and examples of the inorganic oxide include silicon oxide and inorganic oxides having a higher refractive index than silicon oxide, such as titanium oxide, zirconium oxide, aluminum oxide, yttrium oxide, tantalum oxide, hafnium oxide, tin oxide, niobium oxide, cerium oxide, and indium oxide. Substoichiometric titanium oxide (TiOx, where x<2, and x is close to 2) may be used, and an ITO film may be used in at least one layer.

The antifouling film is a film formed so as to have a surface peel strength of 0.10 newtons (N)/19 millimeters (mm). The peel strength refers to the average load per unit width required to peel an adhesive tape having a predetermined width from the antifouling film, as measured by peeling the adhesive tape at a rate of 300 mm/minute (min) in the direction of 180 degrees after sufficiently and firmly bonding the adhesive tape. A lower peel strength indicates a weaker adhesion force.

The antifouling film is preferably made of a silane compound having a perfluoropolyether group, and preferably formed by coating using a dipping method and then curing. The silane compound is such a compound that a coating film when made only of the silane compound has a peel strength is 0.10 N/19 mm or less.

EXAMPLES

As described below, Examples 1 to 5 were fabricated as examples belonging to the optical product of the present invention. Comparative Examples 1 to 6 that do not belong to the present invention were also fabricated for comparison with Examples 1 to 5. Measurements of various values, a dust adhesion test, and the like were then performed. Table 1 below shows the characteristics, test results, and so forth of Examples 1 to 5 and Comparative Examples 1 to 6.

TABLE 1

| | | Examples | | | | | |
|---|---|---|---|---|---|---|---|
| | | Comparative Example 1 | Example 1 | Comparative Example 2 | Example 2 | Comparative Example 3 | Example 3 |
| Base Material Refractive Index | | 1.60 | 1.60 | 1.70 | 1.70 | 1.70 | 1.70 |
| Antireflection Film | | Inorganic 5-layer (SiO2/ZrO2) | | Inorganic 7-layer (SiO2/ZrO2) | | Inorganic 7-layer (SiO2/TiO2) | |
| Antifouling Film | | A | B | A | B | A | B |
| Peel Strength [N/19 mm] | | 0.15 | 0.06 | 0.15 | 0.06 | 0.15 | 0.06 |
| Charged electrostatic Potential [kV] | Immediately After Rubbing | −4.00 | −1.50 | −2.50 | −1.80 | −2.30 | −1.20 |
| Dust Adhesion Test | Expanded Polystyrene Test | x | ○ | x | ○ | x | ○ |
| | Adhesion Ratio of Expanded Polystyrene | 100% | 5% | 100% | 5% | 100% | 5% |
| | Steel Wool Test | x | Δ | x | Δ | x | Δ |
| Overall Evaluation | | x | ○-Δ | x | ○-Δ | x | ○-Δ |

TABLE 1-continued

|  |  | Examples | | | | |
| --- | --- | --- | --- | --- | --- | --- |
|  |  | Comparative Example 4 | Example 4 | Example 5 | Comparative Example 5 | Comparative Example 6 |
| Base Material Refractive Index |  | 1.60 | 1.60 | 1.60 | 1.60 | 1.60 |
| Antireflection Film |  | Inorganic 7-layer (SiO2/TiO2) Insert Substoichiometric Titanium Oxide Film | | Inorganic 5-layer | Organic AR | Organic AR |
| Antifouling Film |  | A | B | A/B = 7/3 | A | B |
| Peel Strength [N/19 mm] |  | 0.15 | 0.06 | 0.09 | 0.15 | 0.06 |
| Charged electrostatic Potential [kV] | Immediately After Rubbing | 0.00 | 0.00 | −1.43 | −6.50 | −6.40 |
| Dust Adhesion Test | Expanded Polystyrene Test | x | ○ | ○ | x | Δ |
|  | Adhesion Ratio of Expanded Polystyrene | 90% | 5% | 5% | 100% | 30% |
|  | Steel Wool Test | ○ | ○ | Δ | x | x |
| Overall Evaluation |  | Δ | ○ | ○-Δ | x | x |

The lens bases of Examples 1 to 5 and Comparative Examples 1 to 6 are flat lenses made of plastic. An episulfide resin having a refractive index of 1.70 was used in Examples 2, 3 and Comparative Examples 2, 3, and a polyurethane resin having a refractive index of 1.60 was used in the other Examples and Comparative Examples.

In Examples 2, 3 and Comparative Examples 2, 3, a primer layer was formed on the front surface of the lens base material. A primer solution was prepared by mixing 25 parts by weight of blocked polyisocyanate ("Coronate 2529" made by Nippon Polyurethane Industry Co., Ltd.), 18 parts by weight of polyester polyol ("Nippollan 100" made by Nippon Polyurethane Industry Co., Ltd.), and 100 parts by weight of ethyl cellosolve, adding 140 parts by weight of a composite sol of tin oxide and tungsten oxide (methanol-dispersed sol, mean particle size: 10 to 15 mm, ratio of tin oxide to tungsten oxide: 100 parts by weight to 40 parts by weight, solid content: 30%) and 0.15 parts by weight of a silicone surfactant to the mixture, and sufficiently stirring and mixing the resultant mixture. Then, the lens base was coated with the primer solution by dipping at a lifting speed of 100 mm/min. The lens base thus coated with the primer solution was heated at 120 degrees Celsius for 30 minutes to cure the primer solution, thereby forming a primer film having a thickness of 1.0 μm.

Next, a hard coat film was formed in Examples 1 to 5 and Comparative Examples 1 to 6. In a reaction container, 206 grams (g) of ethanol, 300 g of a methanol-dispersed titania sol (made by JGC Catalysts and Chemicals Ltd., solid content: 30%), 60 g of γ-glycidoxypropyltrimethoxysilane, 30 g of γ-glycidoxypropylmethyldiethoxysilane, and 60 g of tetraethoxysilane were placed, and 0.01 N (normality) of a hydrochloric acid aqueous solution was dropped into the mixed solution. The resultant mixed solution was stirred to cause hydrolysis. Then, 0.5 g of a flow regulating agent ("L-7604" made by Dow Corning Toray Co., Ltd.) and 1.0 g of a catalyst were added, and the resultant mixed solution was stirred at room temperature for 3 hours to produce a hard coat solution. The lens base was coated with this hard coat solution by a dipping method, air-dried, and then heated at 110 degrees Celsius for 2 hours to cure the hard coat solution, thereby forming a hard coat film having a thickness of 2.0 μm.

Various antireflection films were subsequently formed. A five-layer multilayer film was formed in Examples 1, 5 and Comparative Example 1. The lens base having the hard coat film was placed in a vacuum vessel, and each layer was sequentially formed by a vacuum deposition method. Regarding the materials of the layers, odd layers were made of silicon dioxide, and even layers were made of zirconium oxide. The optical thicknesses of the layers were $0.214\lambda$, $0.080\lambda$, $0.071\lambda$, $0.389\lambda$, and $0.236\lambda$ in that order from the side of the hard coat film (the lens base material), where $\lambda$ is a wavelength and $\lambda=500$ nm.

A seven-layer multilayer film was formed in Example 2 and Comparative Example 2. This multilayer film was formed in a manner similar to that of Examples 1, 5 and Comparative Example 1. The optical thicknesses of the layers were $0.078\lambda$, $0.056\lambda$, $0.487\lambda$, $0.112\lambda$, $0.059\lambda$, $0.263\lambda$, and $0.249\lambda$ in that order from the side of the hard coat film, where the wavelength was set to $\lambda=500$ nm.

A seven-layer multilayer film was formed in Example 3 and Comparative Example 3. This multilayer film was formed in a manner similar to that of Examples 1, 5 and Comparative Example 1. Regarding the materials, of the layers, odd layers were made of silicon dioxide, and even layers were made of titanium oxide. The optical thicknesses of the layers were $0.074\lambda$, $0.061\lambda$, $0.113\lambda$, $0.180\lambda$, $0.061\lambda$, $0.168\lambda$, and $0.273\lambda$ in that order from the side of the hard coat film. The pressure was adjusted by introducing oxygen gas so that the pressure became 0.010 pascals (Pa) at the time of titanium oxide deposition. The wavelength was set to $\lambda=500$ nm.

A seven-layer multilayer film was formed in Example 4 and Comparative Example 4. This multilayer film was formed in a manner similar to that of Example 3 and Comparative Example 3, and only the fourth layer from the side of the hard coat film was made of substoichiometric titanium oxide. The optical thicknesses of the layers were $0.074\lambda$, $0.061\lambda$, $0.113\lambda$, $0.185\lambda$, $0.061\lambda$, $0.168\lambda$, and $0.273\lambda$ in that order from the side of the hard coat film (where the wavelength was set to $\lambda=500$ nm). In this case, substoichiometric titanium oxide was formed by vapor-depositing substoichiometric titanium oxide in a vacuum chamber having introduced therein oxygen gas for adjusting the degree of vacuum. The pressure was adjusted by introducing the oxygen gas so that the pressure became 0.0050 pascals (Pa) at the time of substoichiometric titanium oxide deposition. An antistatic property can be obtained by providing the substoichiometric titanium oxide layer exhibiting a conductive property. Note that an ITO film, a combination of an ITO film and a substoichiometric titanium oxide film, or the like may be used as a conductive film.

Although trititanium pentoxide ("OS-50" made by Canon Optron, Inc.) was used as a vapor deposition material of substoichiometric titanium oxide, and substoichiometric titanium oxide was vapor-deposited while being produced by the following reaction, any titanium oxide can be used.

$$Ti_3O_5 + \delta O_2 \rightarrow 3TiOx$$

In this example, the value of "x" (the substoichiometric value) in TiOx can be finely adjusted by the amount of oxygen gas that is introduced into the vacuum chamber (a vacuum atmosphere) during deposition, and the pressure during deposition is determined by the amount of oxygen gas introduced. That is, the higher the pressure during deposition is, the more oxygen gas is introduced, whereby x approaches 2. The lower the pressure during deposition is, the less oxygen gas is introduced, whereby x becomes less than 2.

Note that a pressure "p" (Pa) during deposition in the vacuum chamber and the optical thickness (refractive index: 2.50, wavelength λ=500 nm) of the substoichiometric titanium oxide layer can be made to have the following relationships: (A) p≥0.005, (B) optical thickness≤0.500, and (C) optical thickness≥(0.001exp(905.73p)−0.050)λ, where "exp" represents an exponential function having a base "e" of a natural logarithm as its base. Thus, a sufficient antistatic property can be obtained while providing a high light transmitting property (non-coloring property), as shown in Table 2 below. Alternatively, the substoichiometric titanium oxide layer may be formed by vapor deposition while assisting the vapor deposition with oxygen ions and/or argon ions, or while performing a plasma treatment. In this case, a higher quality substoichiometric titanium oxide layer can be formed. Moreover, the substoichiometric titanium oxide layer may be formed as a high refractive index layer at another position in the antireflection film (the optical multilayer film), or formed as an independent substoichiometric titanium oxide film.

TiOx film was formed, with the respective optical thicknesses and the respective pressures during deposition, on each of the front surfaces of plastic bases having the hard coat film thereon and a refractive index of 1.60, and the front surfaces of glass bases. In this case, the TiOx films in the former plastic bases were used to check for antistatic performance and coloring in appearance. The TiOx films in the latter glass bases were used to calculate the light absorption ratio.

In Table 2, the Antistatic column shows the level of antistatic performance as determined based on the measurement of a charged electrostatic potential and adhesion of steel wool powder, where a circle indicates a high antistatic performance, and a cross indicates a relatively low antistatic performance. The Coloring column shows the level of the light transmitting property as determined based on the observation of appearance and calculation result of the light absorption ratio, where a circle indicates a high light transmitting property, and a cross indicates a relatively low light transmitting property.

The above relationships (A) to (C) are determined based on the range in which both the antistatic property and the light transmitting property are obtained in Table 2. In particular, the relationship (A) is determined as described above because an optical thickness exceeding 0.500λ affects optical characteristics (the light transmitting property and the like) of the TiOx film. The relationship (C) is determined as described above by fitting an exponential function {optical thickness= (a·exp(b·p))λ} having a base "e" of a natural logarithm as its base, in a state with a minimum error (by the least squares method), for the lower limit of the range of the optical thickness in which both the antistatic property and the light transmitting property are obtained (in consideration of an error

TABLE 2

| | | Film Forming Pressure [Pa] | | | | | | | |
|---|---|---|---|---|---|---|---|---|---|
| | | 7.50E−03 | | 6.70E−03 | | 6.00E−03 | | 5.50E−03 | |
| | | Antistatic | Coloring | Antistatic | Coloring | Antistatic | Coloring | Antistatic | Coloring |
| Optical Thickness (λ = 500 nm) | 0.500λ | x | ○ | ○ | ○ | ○ | ○ | — | — |
| | 0.450λ | — | — | ○ | ○ | ○ | ○ | — | — |
| | 0.400λ | — | — | x | ○ | ○ | ○ | — | — |
| | 0.350λ | — | — | x | ○ | — | — | — | — |
| | 0.300λ | — | — | x | ○ | ○ | ○ | — | — |
| | 0.250λ | — | — | x | ○ | — | — | — | — |
| | 0.200λ | — | — | x | ○ | ○ | ○ | ○ | ○ |
| | 0.150λ | — | — | x | ○ | x | ○ | ○ | ○ |
| | 0.100λ | — | — | x | ○ | x | ○ | — | — |
| | 0.050λ | x | ○ | x | ○ | — | — | — | — |

| | | Film Forming Pressure [Pa] | | | | | | | |
|---|---|---|---|---|---|---|---|---|---|
| | | 5.00E−03 | | 4.00E−03 | | 3.00E−03 | | 2.00E−03 | |
| | | Antistatic | Coloring | Antistatic | Coloring | Antistatic | Coloring | Antistatic | Coloring |
| Optical Thickness (λ = 500 nm) | 0.500λ | ○ | ○ | — | — | — | — | ○ | X |
| | 0.450λ | — | — | — | — | — | — | — | — |
| | 0.400λ | ○ | ○ | — | — | — | — | — | — |
| | 0.350λ | — | — | — | — | — | — | — | — |
| | 0.300λ | ○ | ○ | — | — | — | — | — | — |
| | 0.250λ | — | — | — | — | — | — | — | — |
| | 0.200λ | ○ | ○ | — | — | — | — | — | — |
| | 0.150λ | ○ | ○ | — | — | — | — | — | — |
| | 0.100λ | ○ | ○ | — | — | — | — | — | — |
| | 0.050λ | x | ○ | x | ○ | x | ○ | ○ | ○ |

Regarding the samples with a symbol other than "−" indicated in the boxes at the intersections of Optical Thickness and Pressure During Deposition in Table 2, a single-layer (±0.05λ) caused by a change in the refractive index or the like due to an error in the degree of vacuum). If the relationships (A) to (C) were satisfied, both the antistatic property and the light transmitting property were obtained even when the TiOx film was formed in at least one layer of the optical multilayer film. Note that, in consideration of an error or the like, the relationship (C) may be optical thickness≥(0.001exp (905.73p)−0.050)λ, or optical thickness≥(0.001exp (905.73p)+0.050)λ, for example. Both the light transmitting property and the antistatic property can be obtained even when the pressure during deposition is $2.0 \times 10^{-3}$ Pa and the optical thickness is 0.050λ. In this case, however, light absorption was verified by an optical thickness meter during deposition of the TiOx film, and thus performance as an optical member was degraded accordingly in this respect.

On the other hand, in Comparative Examples 5, 6, a single-layer organic antireflection film was formed by a spin coating method. A solution ("X-12-2510A" made by Shin-Etsu Chemical Co., Ltd.) mainly containing several kinds (compositions) of fluorine-containing organic silicon compounds and having a solid content of 3% was used as a coating solution for forming the organic antireflection film. The front surface of the hard coat film on the convex surface side of the lens base was subjected to a corona treatment for 20 seconds at a distance of 30 mm, and then coated with the coating solution by a spin coating treatment at a rotational speed of 1,300 rpm (rotations/min) for rotation time of 30 seconds, and subsequently heated at 100 degrees Celsius for 15 minutes to cure the coating solution. After heat-curing, the concave surface side was treated in a manner similar to that of the convex surface side, and the coating solution was cured at 110 degrees Celsius for 1 hour, thereby forming an organic anti-reflection film.

Three kinds of antifouling films were formed next. An antifouling film A described below was formed in Comparative Examples 1 to 5. An antifouling film B described below was formed in Examples 1 to 4, and Comparative Example 6. An antifouling film having the properties of both the antifouling films A and B, described below, was formed in Example 5.

The antifouling film A was formed from an antifouling treatment solution having a solid content of 0.2%, which is produced by diluting a perfluoropolyether silane compound ("KY-8" made by Shin-Etsu Chemical Co., Ltd.) with a fluorine solvent ("Novec HFE-7200" made by Sumitomo 3M Limited). The antifouling film A was obtained by coating the lens base having the antireflection film formed thereon with this treatment solution by dipping for a dipping time of 30 seconds and at a lifting speed of 180 min/min, and curing the treatment solution in a constant-temperature, constant-humidity environment having a temperature of 60 degrees Celsius and a humidity of 80%. The surface peel strength of the antifouling film A is 0.15 N/19 mm. The peel strength was obtained by first measuring loads per unit width (19 mm) required to peel an adhesive tape ("No. 31B" made by Nitto Denko Corporation, width: 19 mm) from the antifouling film A, when peeling the adhesive tape at a rate of 300 mm/min in the direction of 180 degrees after firmly bonding the adhesive tape at 20 g/cm² for 24 hours, and then calculating the average value of the measured loads.

The antifouling film B was formed by performing a treatment in a manner similar to that of the antifouling film A using a perfluoropolyether silane compound ("X-71-166" made by Shin-Etsu Chemical Co., Ltd.). The surface peel strength of the antifouling film B was 0.06 N/19 min.

In Example 5, a treatment solution having a solid content of 0.2% was obtained by sequentially mixing the perfluoropolyether silane compounds of the antifouling films A and B at a solid content ratio of 7 to 3 (A/B=7/3). Then, the antifouling film was formed by performing a treatment in a manner similar to that of the antifouling film A. The surface peel strength was 0.09 N/19 mm.

Measurement of the charged electrostatic potential and the dust adhesion test were performed on various optical products thus obtained.

Measurement of the charged electrostatic potential was performed as follows. The charged electrostatic potential (in kilovolts, kV) was, measured immediately after rubbing the convex surface of the lens with nonwoven fabric ("pure leaf" made by Ozu Corporation) 20 times back and forth for 10 seconds with a load of 1 kilogram. The measurement was performed with a static electricity measuring apparatus ("FMX-003" made by Simco Japan).

The absolute value of the charged electrostatic potential was the same in Examples 1 to 4 and Comparative Examples 1 to 4, or slightly lower in Examples 1 to 4. In Example 4 and Comparative Example 4, the charged electrostatic potential was zero due to the formation of the substoichiometric titanium oxide layer exhibiting a conductive property, and thus Example 4 and Comparative Example 4 exhibit an antistatic property.

The dust adhesion test was performed as follows. Each of the various optical products was sequentially placed, one at a time, into a polypropylene tray containing expanded polystyrene beads (substantially spherical with a diameter of approximately 1.6 mm). A lid was placed on the tray, and the tray was shook for 10 seconds (approximately 20 times back and forth). Thereafter, the optical product was gently removed from the fray, and examined for adhesion of the expanded polystyrene beads to the optical product. In Table 1, a circle indicates almost no adhesion, a triangle indicates adhesion to a part of the surface of the optical product, and a cross indicates adhesion to almost the entire surface of the optical product. The ratio of the area occupied by the adhered expanded polystyrene beads to the area of the entire surface of the optical product was also calculated as an adhesion ratio of the expanded polystyrene beads.

A dust adhesion test using steel wool was also performed. After similarly rubbing the surface of the optical product with nonwoven fabric, the optical product was moved toward finely cut pieces of steel wool to see if the steel wool was adhered to the convex surface of the lens. In Table 1, a circle indicates no adhesion, a triangle indicates adhesion to a part of the surface of the optical product, and a cross indicates adhesion to almost the entire surface of the optical product.

An overall evaluation of the various optical products was made based on the dust adhesion test and so forth. In Table 1, a circle indicates almost no adhesion of the expanded polystyrene beads and the steel wool, and thus indicates that a satisfactory antidust property (antifouling property) was obtained. A circle-triangle indicates that either the expanded polystyrene beads or the steel wool was somewhat adhered, and thus indicates that a somewhat satisfactory antifouling property was obtained. A triangle indicates that adhesion of either the expanded polystyrene beads or the steel wool was recognized, and thus indicates that the antifouling property was relatively low. A cross indicates that adhesion of both the expanded polystyrene beads and the steel wool was recognized, and thus indicates that the antifouling property was low.

Note that the various optical products were also examined for the light transmitting property. For each optical product, reflectance in the visible region was within several percent or less. All of the optical products were transparent, and there was no problem with the light transmitting property.

The above description shows that Example 4, which has a low charged electrostatic potential, a sufficiently low surface peel strength, and the substoichiometric titanium oxide layer exhibiting a conductive property, also has the highest antifouling property. As can be seen from Comparative Example 4, the optical product merely having a low charged electrostatic potential does not exhibit a sufficient antifouling property against expanded polystyrene having static electricity.

As in Examples 1 to 3, even if the charged electrostatic potential is somewhat high, the optical product merely adheres a small amount of steel wool as long as the absolute value of the charged electrostatic potential is 2.00 kV or less. Thus, due to its low peel strength and the like, the optical product can exhibit an antifouling property against expanded polystyrene having static electricity. Moreover, due to the low peel strength and the like, the adhered steel wool and expanded polystyrene can be easily removed, and the optical product can exhibit a high antifouling property in this regard as well. That is, a higher-level antifouling property can be obtained by making the peel strength equal to or less than 0.10 N/19 mm while making the absolute value of the charged electrostatic potential equal to or less than 2.00 kV, rather than by providing a high-performance antistatic film (conductive film) to make the charged electrostatic potential equal to zero.

On the other hand, if the absolute value of the charged electrostatic potential is larger than 2.00 kV as in Comparative Example 6, even if the peel strength is low, the optical product cannot exhibit an antifouling property against steel wool and cannot exhibit a high antifouling property against expanded polystyrene. Note that the adhered steel wool and expanded polystyrene are adhered by the charged electrostatic potential and the like, thus making them difficult to remove.

Moreover, as in Example 5, an antifouling property can be obtained against both the expanded polystyrene and the steel wool, even if the peel strength is adjusted to 0.09 N/19 mm (the absolute value of the charged electrostatic potential is 2.00 kV or less). Note that antifouling films having different surface peel strengths from each other were produced by sequentially mixing the perfluoropolyether silane compounds of the antifouling films A and B at various solid content ratios such as 6/4, and the dust adhesion test was similarly performed. The test result showed that in the case where the absolute value of the charged electrostatic potential is 2.00 kV or less, a sufficient antifouling property can be obtained against both the expanded polystyrene and the steel wool if the peel strength is 0.10 N/19 mm.

That is, a high antifouling performance can be achieved by introducing the antifouling film having (1) the charged electrostatic potential whose absolute value is equal to or less than 2.00 kV, and (2) the surface peel strength of 0.10 N/19 mm or less.

Moreover, an optical product having strength, optical characteristics such as antireflection, and a high-level antifouling property can be configured by placing the hard coat film and the optical multilayer film between the base and the antifouling film.

The optical product can be provided with a higher-level antifouling performance by placing the conductive film between the base and the antifouling film. Forming the conductive film as at least one layer of the optical multilayer film can further provide the optical property with strength and optical characteristics such as antireflection, whereby an efficient film configuration can be implemented in which the optical multilayer film has a function of the conductive film as well. Moreover, forming the substoichiometric titanium oxide film as the conductive film can facilitate formation of the conductive film, and the conductive film having a sufficient antistatic property as well as a high light transmitting property can be formed by forming the substoichiometric titanium oxide film under the above conditions (A) to (C) or the like.

Furthermore, forming the antifouling film from a silane compound having a perfluoropolyether group can facilitate formation of the antifouling film satisfying (1) and (2) described above, and can facilitate adjustment of the peel strength.

In addition, since the optical multilayer film is a multilayer film of inorganic oxides, formation of the optical multilayer film can be facilitated, and an optical product having both an optical performance and antifouling performance can be provided by achieving satisfactory matching with the antifouling film.

Furthermore, since the hard coat film is made of an organosiloxane resin, inorganic oxide fine particles, and the like, an optical product having high strength can be provided by achieving satisfactory matching with the optical multilayer film.

Moreover, a spectacle plastic lens exhibiting a high antifouling performance while having an antireflection performance can be provided by using an antireflection film as the optical multilayer film and using a base of the spectacle plastic lens as the base of the optical product.

What is claimed is:
1. An optical product, comprising
a base;
a hard coat film formed on the base;
an optical multilayer film formed on the hard coat film, the optical multilayer film being a multilayer film made of an inorganic oxide; and
an antifouling film formed on the optical multilayer film by performing coating with a silane compound having a perfluoropolyether group, so as to satisfy the following conditions:
(1) an absolute value of a charging potential is 2.00 kV or less, and
(2) a surface peel strength is 0.10 N/19 mm or less.
2. The optical product according to claim 1, wherein
the hard coat film contains an organosiloxane resin and inorganic oxide fine particles.
3. A spectacle plastic lens, comprising:
the optical product according to claim 1, wherein the base of the optical product is a base of the spectacle plastic lens, and the optical multilayer film is an antireflection film.

* * * * *